(12) United States Patent
Martin et al.

(10) Patent No.: US 10,031,485 B2
(45) Date of Patent: Jul. 24, 2018

(54) WATCHMAKER'S PORTABLE LUBRICATION TOOL

(71) Applicant: The Swatch Group Research and Development Ltd, Marin (CH)

(72) Inventors: Jean-Claude Martin, Montmollin (CH); Michel Willemin, Preles (CH)

(73) Assignee: The Swatch Group Research and Development Ltd, Marin (CH)

( * ) Notice: Subject to any disclaimer, the term of this patent is extended or adjusted under 35 U.S.C. 154(b) by 7 days.

(21) Appl. No.: 15/116,283

(22) PCT Filed: Apr. 2, 2015

(86) PCT No.: PCT/EP2015/057368
§ 371 (c)(1),
(2) Date: Aug. 3, 2016

(87) PCT Pub. No.: WO2015/176864
PCT Pub. Date: Nov. 26, 2015

(65) Prior Publication Data
US 2017/0003656 A1   Jan. 5, 2017

(30) Foreign Application Priority Data

May 21, 2014  (EP) ..................... 14169204

(51) Int. Cl.
| A45D 33/00 | (2006.01) |
| G04D 5/00 | (2006.01) |
| F16N 19/00 | (2006.01) |
| F16N 37/00 | (2006.01) |
| G02B 25/00 | (2006.01) |

(52) U.S. Cl.
CPC ........... G04D 5/005 (2013.01); F16N 19/003 (2013.01); F16N 37/00 (2013.01); G02B 25/008 (2013.01); G04D 5/00 (2013.01)

(58) Field of Classification Search
CPC ........ G04D 5/00; G04D 5/005; F16N 19/003; F16N 37/00
See application file for complete search history.

(56) References Cited

U.S. PATENT DOCUMENTS 5,283,920 A    2/1994  Plummer

FOREIGN PATENT DOCUMENTS

| CH | 239 788 A | 11/1945 |
| CH | 240 514 A | 12/1945 |
| FR | 1 045 971 A | 12/1953 |
| FR | 1 124 292 A | 10/1956 |

OTHER PUBLICATIONS

International Search Report for PCT/EP2015/057368 dated Mar. 24, 2016.

*Primary Examiner* — Jennifer C Chiang
(74) *Attorney, Agent, or Firm* — Sughrue Mion, PLLC

(57) ABSTRACT

Watchmaker's portable lubrication tool including at least one lubricant reservoir, with a plurality of chambers, each only accessible to a user in a first open position of the tool, each reservoir being closable by a sealed lid which, in a second closed position, is kept sealingly pressed on the reservoir, and the tool includes a structure which carries such a lid associated with such a reservoir, and which is a component of a multi-function pocket knife of the "Swiss army knife" type, with a frame on which pivots a plurality of blades, the tool comprises at least one elastic return arranged to exert, in the second closed position, a force on at least one lid to press it sealingly on an associated reservoir.

21 Claims, 8 Drawing Sheets

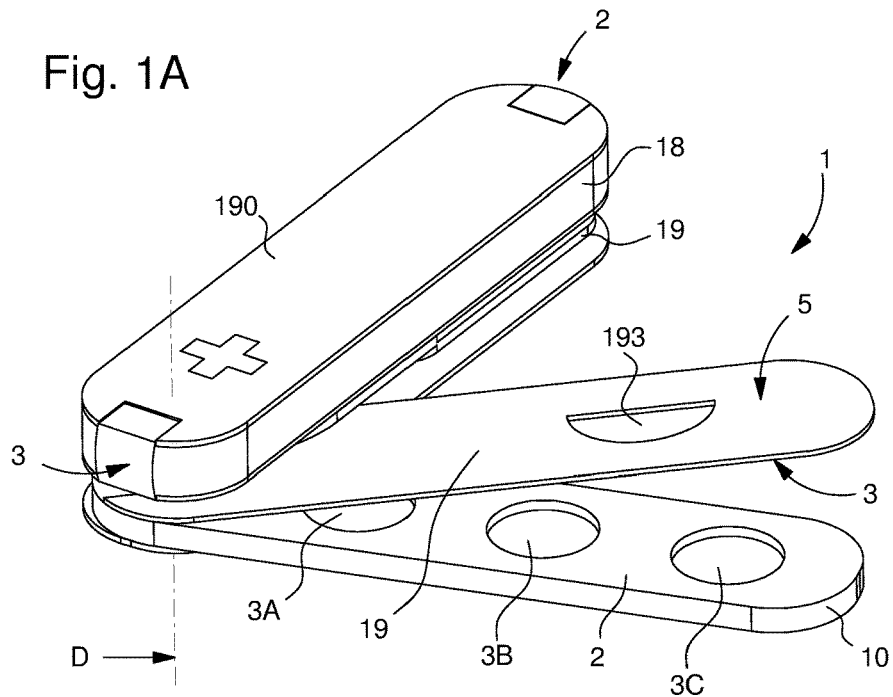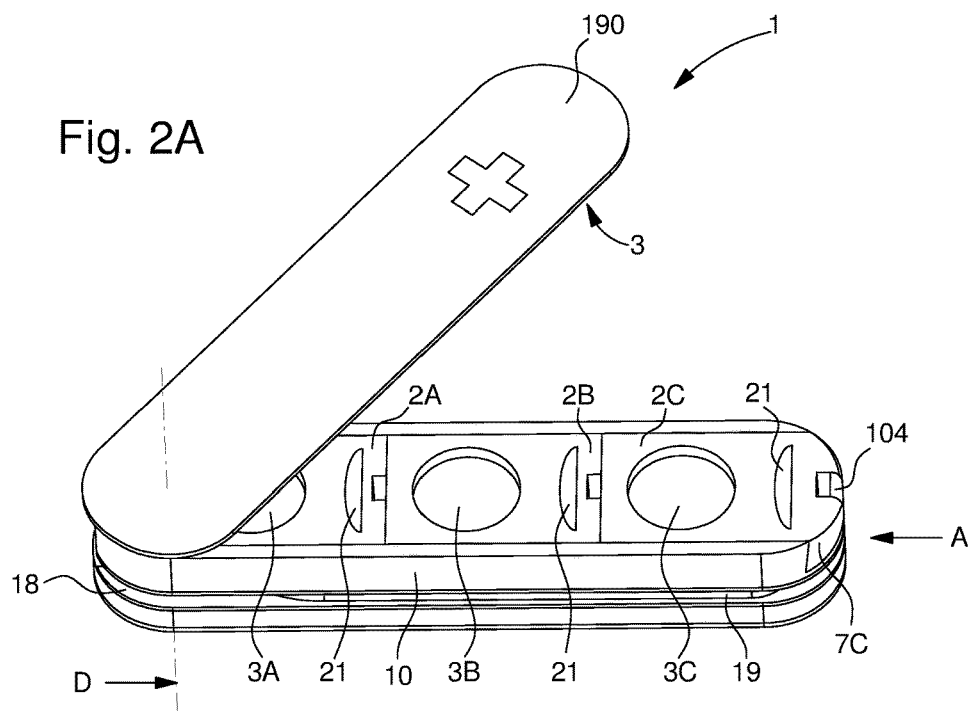

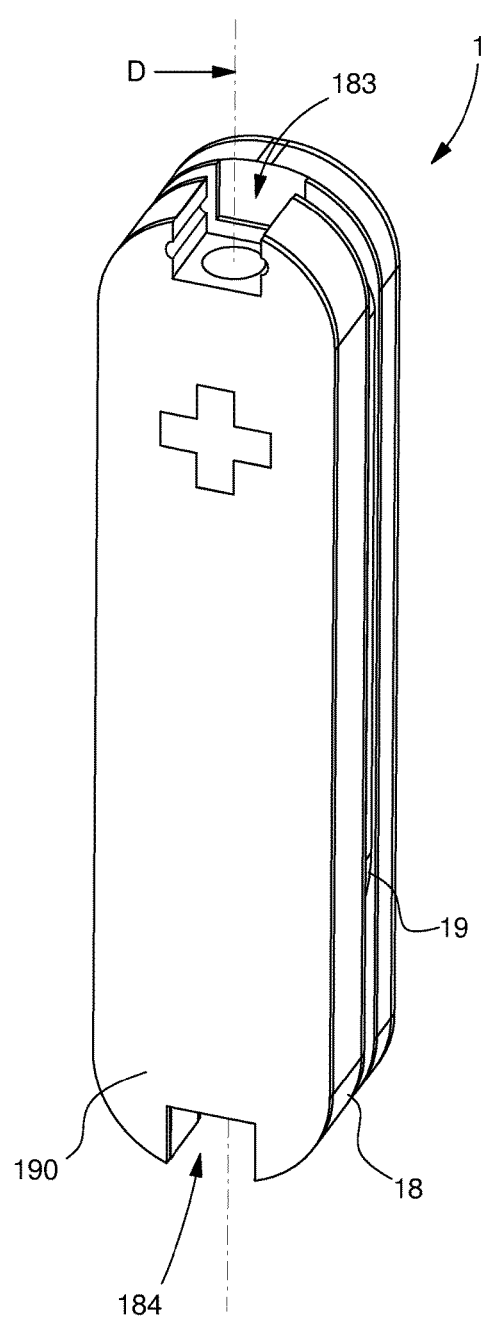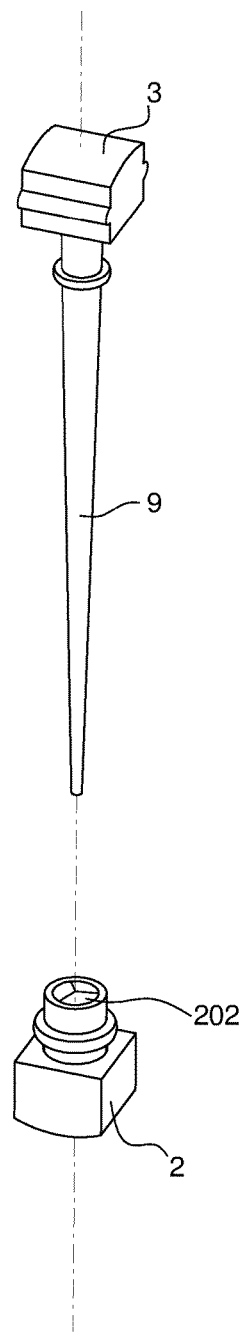

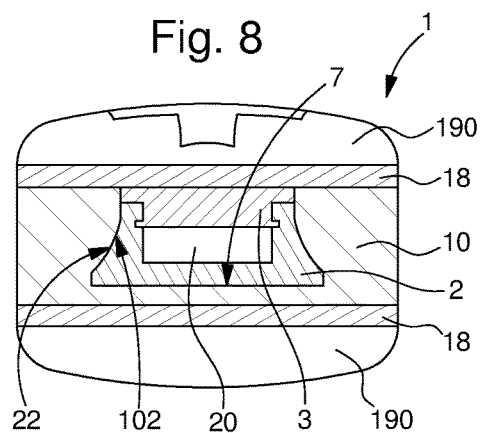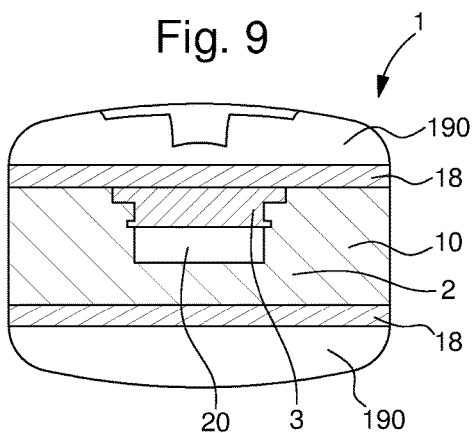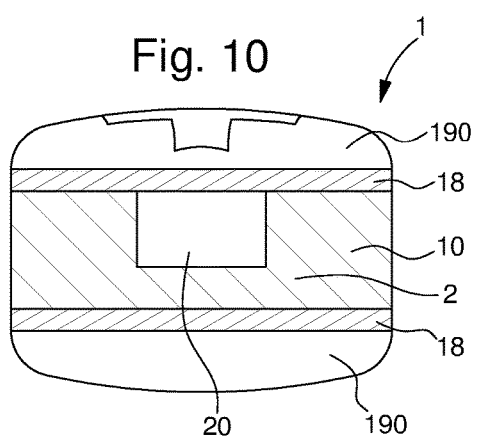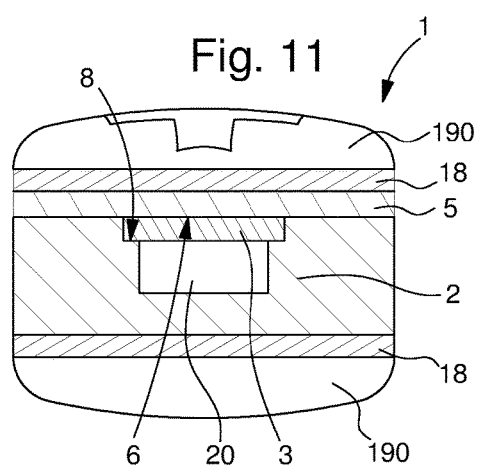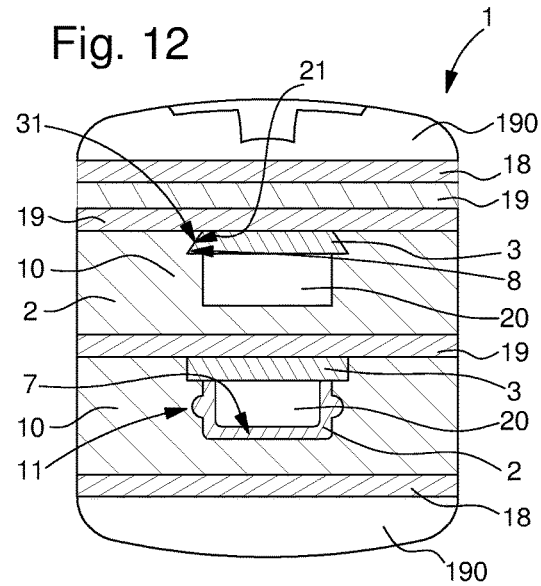

WATCHMAKER'S PORTABLE LUBRICATION TOOL

This is a National phase application in the United States of International patent application PCT/EP2015/057368 filed Apr. 2, 2015 which claims priority on European patent application 14169204.6 filed May 21, 2014. The entire disclosures of the above patent applications are hereby incorporated herein by reference.

FIELD OF THE INVENTION

The invention concerns a watchmaker's portable lubrication tool, which comprises a plurality of reservoirs for horological lubricants, each only accessible to a user in a first open position of said tool, each said reservoir being closable by at least one sealed lid which, in a second closed position, is kept sealingly pressed on said reservoir.

The invention concerns the field of tools for precision mechanics, and notably tools for watchmakers, and more particularly for tasks of lubricating watches or timepieces.

BACKGROUND OF THE INVENTION

Lubricating a timepiece is an essential operation, for which there are few tools, except for the automatic oiler and the oil-pot. These tools are well suited for the manufacturing bench, but less so for on-site operations, or even simply for the work station of watch repairers who have very little work space.

CH Patent Application 240514A in the name of JEANNERET discloses a lubricant dispenser, with a base comprising at least one lubricant cup, which is fitted inside a housing in the base provided with a movable lid which forms a support for a removable oil-pike, the latter being usable to operate the lid while extending, at rest, in a recess in the base protected from dust. This well designed oiler is, however, of a traditional type, and reserved for use on the workbench, placed on a flat surface.

FR Patent 1124292 in the name of CHARDON discloses lubrication using a graphite powder, with powder recesses disposed in the mechanisms to be lubricated.

CH Patent Application 239788A in the name of PIAGET discloses an oil-pot with a tinted reservoir bulb to obstruct light, fitted inside a sleeve provided with a bulb, one end of the reservoir is a capillary tube, insertable, when not in use, into a protective support block. This tool is fragile and unsuitable for portable use.

SUMMARY OF THE INVENTION

For operations outside the watchmaker's workshop there is a recurrent need for lubrication means, for which no good compact solution exists allowing clean oil to be carried securely and easily identified with no risk of confusion.

Therefore, the invention proposes to provide the watchmaker with a watchmaker's portable lubrication tool.

To this end, the invention concerns a watchmaker's portable lubrication tool, which comprises a plurality of reservoirs for horological lubricants, each only accessible to a user in a first open position of said tool, each said reservoir being closable by at least one sealed lid which, in a second closed position, is kept sealingly pressed on said reservoir, characterized in that said tool comprises a carrier structure for at least one said reservoir and for a said lid associated with said reservoir, and in that said structure is a component of a multi-function pocket knife of the "Swiss army knife" type, which comprises a frame on which pivots a plurality of blades.

BRIEF DESCRIPTION OF THE DRAWINGS

Other features and advantages of the invention will appear upon reading the following detailed description, with reference to the annexed drawings, in which:

FIG. 1A represents, in a similar manner to FIG. 1, a lug-free variant, in this case the lids are only kept pressed in position in the closed position of the pivoting element and of the structure carrying reservoirs inside the body of the tool in the closed position.

FIG. 2A represents, in a similar manner to FIG. 2, a variant wherein the carrier structure carries several reservoirs each with a dovetail guide.

FIGS. 3A and 4A represent a variant with the detail of the snap-fit means for fitting the lid of the oil-pike into the body of the tool, and wherein the reservoir is snap-fitted to the lower end of the tool, at the opposite side to the oil-pike, the upper part of which is identified by a Swiss Cross mark.

FIGS. 6 to 12 and 14 show cross-sectional views of different variants of arrangement of the tool according to the invention.

DETAILED DESCRIPTION OF PREFERRED EMBODIMENTS

Figure 1:
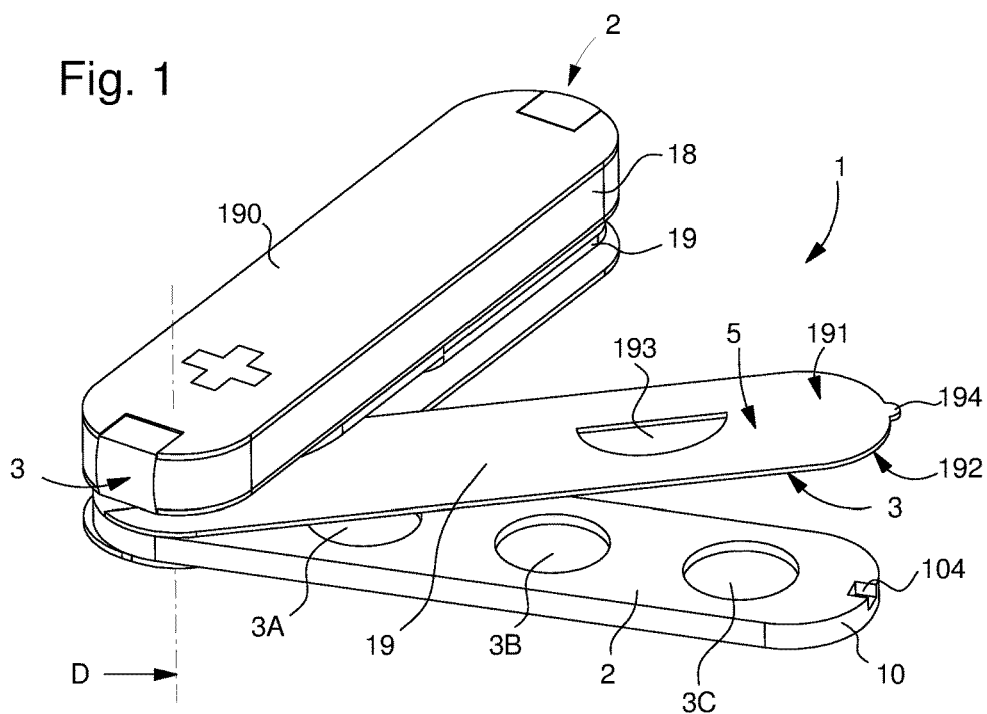
FIG. 1 shows a schematic and perspective view of a tool of the invention, in a particular and non-limiting variant embodiment, with a so-called "Swiss army knife" multi-use knife structure, comprising, arranged as a knife blade, a structure carrying reservoirs delimiting chambers each containing a lubricant, these chambers each being closed by a lid; a pivoting element also similar to a blade is superposed on this carrier structure, and immobilises the lids in a closed position when the pivoting element is superposed on the carrier structure, by a lug cooperating with a groove.

The invention proposes to offer the watchmaker a portable tool 1, carrying elements necessary for the maintenance or after-sales service of a watch or of a clock, or of a building clock. This tool can be used by any specialist in precision mechanics.

For operations outside the watchmaker's workshop there is a recurrent need for lubrication means, for which no good compact solution exists to allow clean oil to be carried securely and easily identified with no risk of confusion.

The invention therefore proposes to provide the watchmaker with a portable watchmaker's lubrication tool 1.

According to the invention, this tool 1 comprises a plurality of chambers 20 comprised in at least one horological lubricant reservoir 2, each only accessible to a user in a first open position of tool 1, each said reservoir 2 being closable by at least one sealed lid 3 which, in a second closed position, is kept sealingly pressed on the reservoir 2 concerned.

Each lubricant reservoir 2 delimits at least one chamber 20 which contains the lubricant.

It is understood that the same physical support can comprise one or more reservoirs 2.

In the case of FIG. 1, a first series of lids 3A, 3B, 3C, directly closing the respective chambers 20 and in contact with the lubricant contained in chambers 20, is kept pressed on chambers 20 by a pivoting element 5, which itself forms a second level of lid 3. Naturally, it is possible for chambers 20 to be directly closed by such a lid 3 formed of a pivoting element 5 or of a sliding element 50.

It is understood that, to prevent any pollution or any mixing of lubricants, each reservoir 2 is advantageously closed by a surface of a lid 3 which is specific thereto, or better still, by a lid 3 which is specific thereto.

To ensure satisfactory sealing, either reservoir 2, or the corresponding lid 3 is preferably made of flexible material. Advantageously, at least one such lid 3 is made of elastic or elastomeric material or of rubber or of cork.

Tool 1 according to the invention preferably comprises at least one elastic return means 4, which is arranged to exert, in the second closed position, a force on the at least one lid 3 to press said lid sealingly on the at least one reservoir 2. In some of the illustrated embodiments, these elastic return means 4 are formed by a blade 19, a pivoting blade 5, or a sliding element 50, comprised in tool 1, for pressing lid 3 onto reservoir 2 when they are in a closed position of tool 1.

Figure 13:
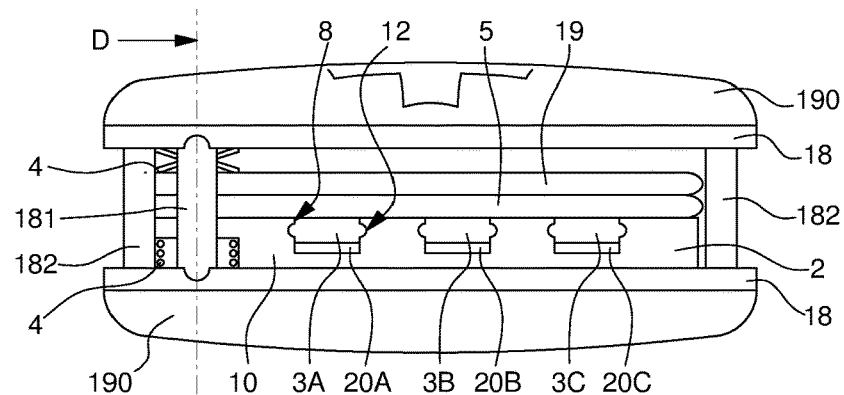
FIG. 13 is a longitudinal section view of the tool of FIG. 1A.

An elastic return means 4 may also comprise one or more springs, as seen in FIG. 13, where two springs tend to press a pivoting blade 5, mounted to pivot on an arbor 181 of pivot axis D. FIG. 1 shows the cooperation of pivoting blade 5, which comprises a lug 194 that cooperates with a slot 104 in a structure 10 carrying chambers 20 to keep them aligned in superposition one above the other. Tool 1 preferably comprises, on a single external part 190 comprised at the periphery thereof, a visual and/or tactile mark (represented here by a Swiss cross), which indicates the upper end of the tool. Pivoting blade 5 and structure 10, which also pivots about the same axis D here, are smooth on their lateral edge and on their lower face, only an upper surface 191 of pivoting blade 5 comprises operating means 193, which oblige the user to operate tool 1 in an opening direction such that structure 10 is presented laying substantially flat, with lids 3 upwards. The user can then open the lid 3 corresponding to the desired lubricant, and remove the latter, without spilling any lubricant. In the particular application illustrated by FIG. 1, maintaining the open position at an angle of 90° or similar provides a convenient and stable support on a horizontal surface while work is performed.

Advantageously, each lid 3 remains attached close to the chamber 20 that it closes, for example by a flexible connection made of plastic or similar material.

In such a variant, a pivoting element 5 is advantageously arranged, in the second closed position, to form a stop surface 6 for such a lid 3, to limit its travel or to compress it onto the corresponding reservoir 2, so as to sealingly close the corresponding chamber 20.

Figure 6:
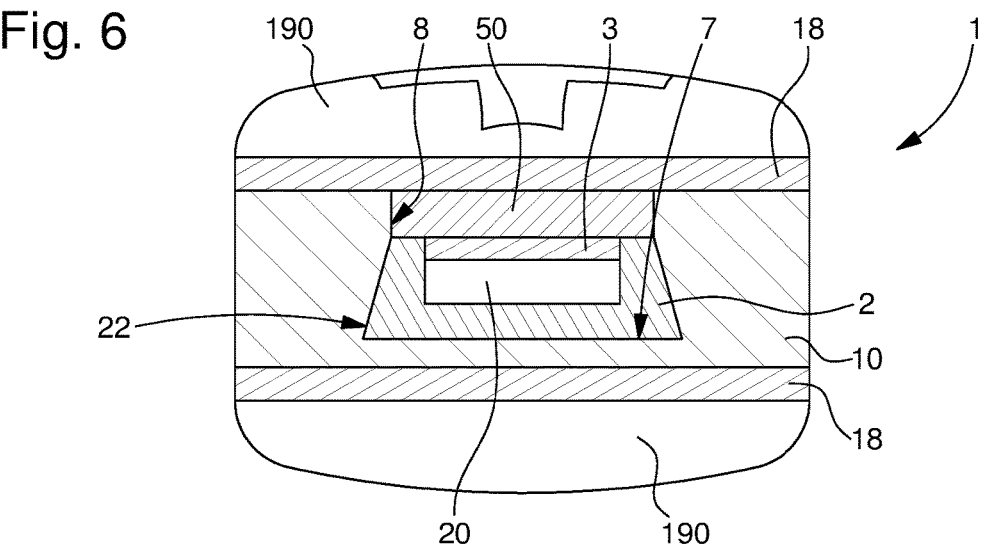

In a variant, instead of a pivoting element, there is used a sliding element 50, as seen in FIG. 6.

In a variant, at least one such lid 3 cooperates with one such reservoir 2 via translational guiding means or via a dovetail guide, as seen in FIG. 12.

In an advantageous variant, tool 1 comprises a first housing 7 for reception of each reservoir 2, which facilitates cleaning and filling. An example is seen in FIG. 2A.

Of course, housing 7 may also directly form a reservoir 2, but the variant of a removable reservoir 2 is advantageous as regards cleaning and keeping tool 1 clean.

Preferably, at least one said reservoir 2 can be removed for cleaning or filling. In addition to the preceding example, FIG. 12 represents a flexible reservoir 2 simply snap-fitted into a structure 10: in this case tool 1 includes first snap-fit means 11 for such a reservoir 2, which are provided in reservoir 2 and/or in a structure 10, which is comprised in tool 1 and carries at least a first housing 7, to keep reservoir 2 inside its first housing 7.

Preferably, tool 1 comprises at least one structure 10 carrying at least one such first housing 7, and at least one such reservoir 2 cooperates with structure 10 via translational guiding means or via a dovetail guide.

Advantageously, tool 1 has at least a second housing 8 for reception of at least one such lid 3.

Tool 1 then advantageously comprises second snap-fit means 12 for at least one such lid 3, which are arranged in lid 3 and/or in a structure 10 which is comprised in tool 1 and carries a second housing 8, to maintain lid 3 in a sealed position in its second housing 8, in a closed position of lid 3.

Figure 14:
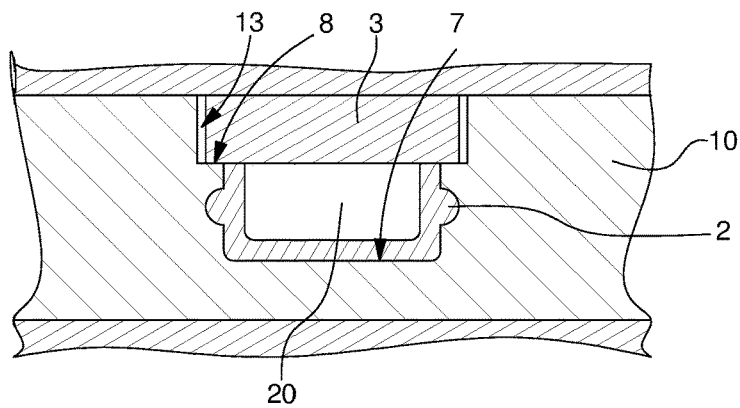
Figure 15:
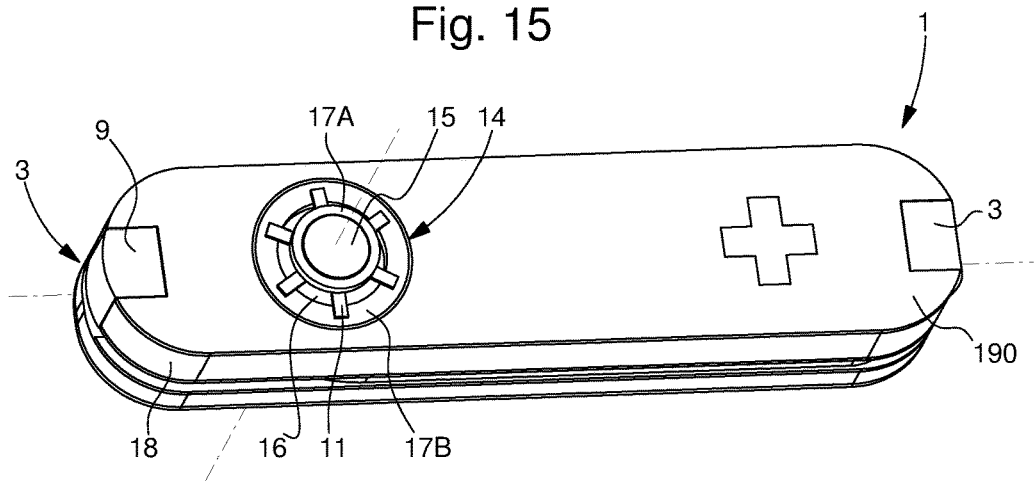
FIG. 15 shows a schematic and perspective view of a "Swiss Army knife" variant carrying a magnifying glass according to FIGS. 5A and 5B, in a snap-fit and capable of extraction to be placed in front of the user's eye.

In the FIG. 14 variant, tool 1 comprises screw means 13 for such a lid 3, which are provided in lid 3 and in a structure 10 which is comprised in tool 1 and carries a second housing 8, to maintain lid 3 in its second housing 8, in a closed position of lid 3.

FIGS. 3, 3A, 4, 4A illustrate a variant arrangement wherein tool 1 comprises at least one oil-pike 9 in one-piece with at least one such lid 3.

Figure 3:
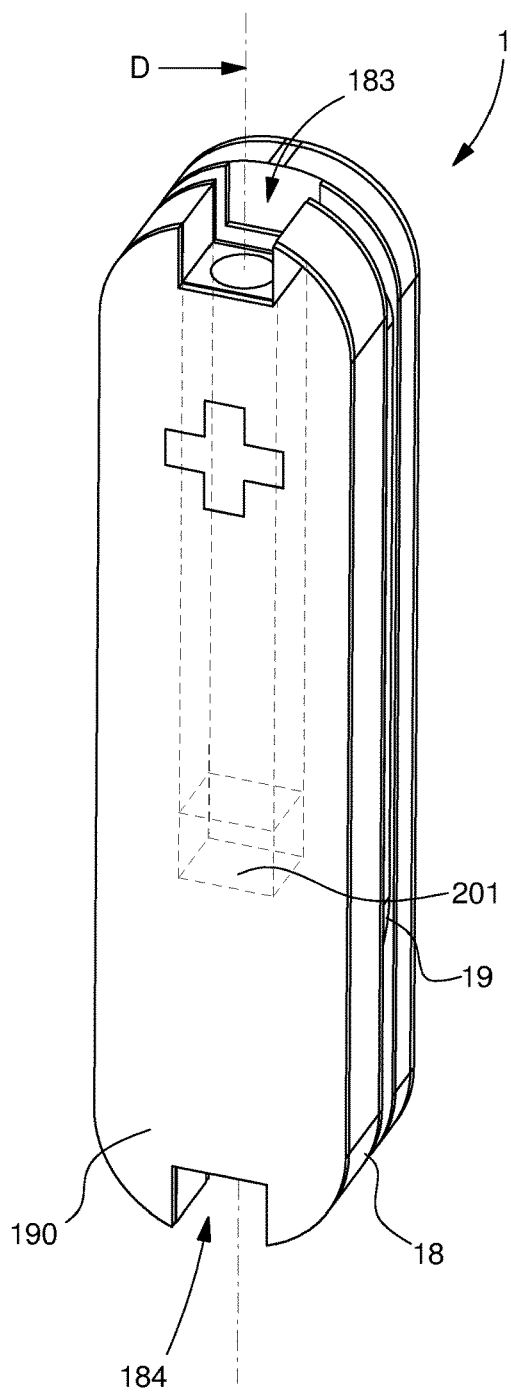
FIG. 3 shows a schematic and perspective view of a "Swiss Army knife" variant, comprising a lubricant reservoir and an oil-pike represented in FIG. 4, the lubricant reservoir being housed inside the body of the tool.
Figure 4:
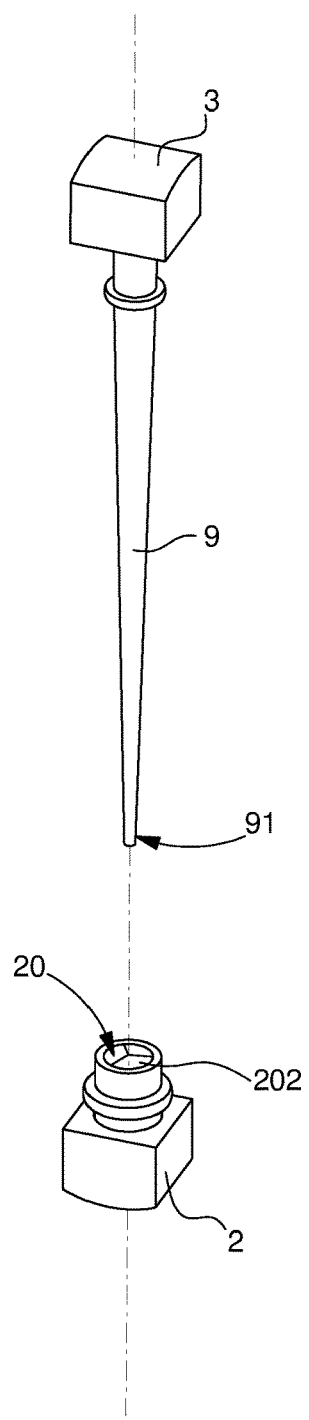

FIGS. 3 and 4 represent a removable reservoir 2 arranged to be fitted in a housing 201 provided in the thickness of a frame 18. This reservoir 2 comprises a slit elastomeric or similar membrane 202, allowing the sealed passage of the end 91 of an oil-pike 9. This oil-pike 9 is housed here, and notably snap-fitted, via an opposite side to that intended for the transfer of lubricant, in a housing 183 comprised in a frame 18 of tool 1.

FIG. 4A represents a removable reservoir 2, similar to that of FIG. 4, but arranged to be snap-fitted into an opening 184 of frame 18. FIGS. 3A and 4A show the detail of the snap-fit cooperation between lid 3 of the oil-pike and housing 183 of frame 18.

In this embodiment, reservoir 2 is advantageously closed by the corresponding oil-pike 9, via snap-fit, screws, press-fit or similar means. This has the advantage of providing one oil-pike per lubricant, thereby avoiding the risk of pollution or the need for cleaning between two applications of two different lubricants. It is, moreover, easy to customise the end portion of oil-pike 9 forming lid 3, according to the application and viscosity of the lubricant concerned.

Naturally, oil-pike 9 may also be independent of any reservoir, to be employed with at least one of chambers 20 comprised in tool 1, in which case oil-pike 9 is simply snap-fitted into a housing; preferably this housing is also removable so that it can be cleaned.

In a particularly advantageous manner, tool 1 is arranged such that each reservoir 2 comprises a colour or optical and/or tactile code relating to the lubricant that it is arranged to contain. Each lid 3, arranged to cooperate with a specific chamber 20 of a specific reservoir 2, comprises the same colour or the same optical and/or tactile code as said specific chamber 20 or as said specific reservoir 2.

The colour of the reservoirs also allows contrast to be improved to estimate the remaining quantity of lubricant. Naturally, it is possible to produce variants with combined reservoirs, to obtain a larger lubricant capacity.

The use of removable reservoirs makes it easy to replace both an individual unit and a complete container.

When tool 1 comprises at least one oil-pike 9 for each category of lubricant, each oil-pike 9 has the same colour or the same optical and/or tactile code as the specific chamber 20 or the specific reservoir 2 associated with the same lubricant.

Advantageously, each oil-pike 9 has a specific form and surface for each said category of lubricant.

Figure 5A:
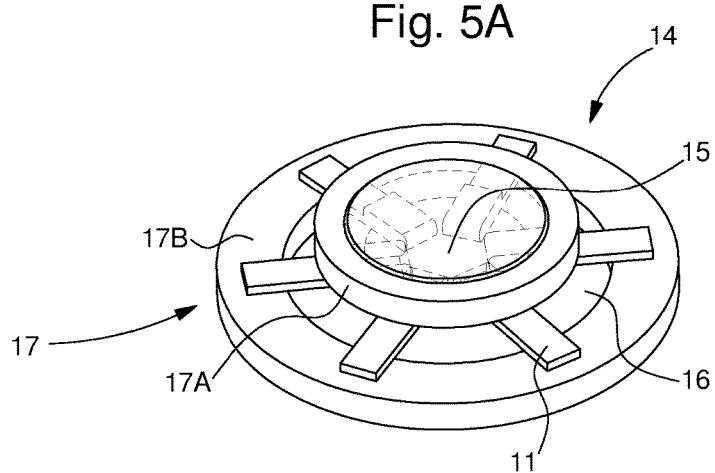
FIGS. 5A to 5C represent a retractable magnifying glass, in retracted and extended positions in a first version in FIGS. 5A and 5B, and in an extended position of a second version in FIG. 5C.
Figure 5B:
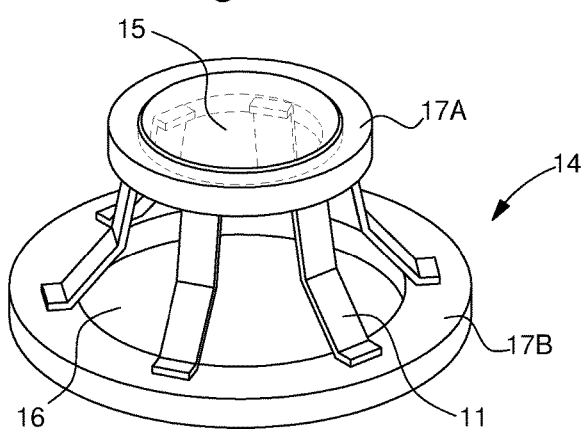
Figure 5C:
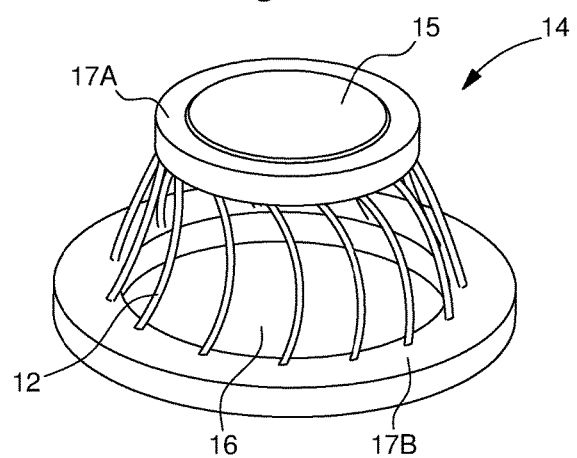

To facilitate the application of lubricant, tool 1 advantageously comprises at least one foldable and preferably removable magnifying glass 14, comprising at least two lenses 15, 16 able to extended or folded away by translation and/or rotation of the body 17 comprised in magnifying glass 14 that carries lenses 15, 16, as seen in FIGS. 5A, 5B, 5C. An inner body 17A carrying a first lens 15, and an outer body 17B carrying a second lens 16, are connected to each other, either by bistable strip springs 11, or by wire springs 12, which allows magnifying glass 14 to be extended, either by translation of a body 17A or 17B in the case of FIGS. 5A and 5B, or by rotation of a body 17A or 17B, in the case of FIG. 5C. It is understood that the magnifying glass is very useful, or even essential, in the context of lubrication of parts in precision mechanics or watchmaking, where the areas to be lubricated are small, and visibility is often poor.

In a practical and particularly compact embodiment, illustrated by the Figures, tool 1 comprises a structure 10 carrying at least one such reservoir 2 and one such lid 3 associated with reservoir 2. This structure 10 is a component of a multi-function pocket knife of the so-called "Swiss Army knife," type, which comprises a frame 18 on which pivots a plurality of blades 19. FIG. 13 illustrates an embodiment with the frame 18 having parallel cheeks connected by tie pieces 182, and which carries a pivot shaft 181 about which pivot one or more blades 19 and/or one or more pivoting elements 5. This frame 18 carries one or more external parts 190, which may in turn carry some components, notably the magnifying glass 14 represented in FIG. 11. In this particular example, magnifying glass 14 is snap-fitted onto an external part 190, and is capable of extraction to be placed in front of the user's eye. Naturally, magnifying glass 14 may also be snap-fitted into an intermediate blade 19 for protection. Magnifying glass 14 may also be in one-piece with such a blade 19, in which case frame 18 of tool 1 can be gripped by the operator like a handle.

In particular, a pivoting element 5 may be formed by a blade 19, which may have the function of a watch case or case back opening tool, a screwdriver, or tweezers or suchlike.

Advantageously, at least one such blade 19 comprises part of the translational guiding means or of said dovetail guide arrangement of at least one reservoir 2.

In a variant, at least one lid 3 is formed by a blade 19.

In a particular variant, tool 1 comprises several oil-pikes 9, and/or at least one blade 19 whose extended end serves as a magnifying glass 14.

The Figures illustrate several variant embodiments of the invention, which are easy to produce and which are non-limiting, and which may be combined with each other.

Figure 2:
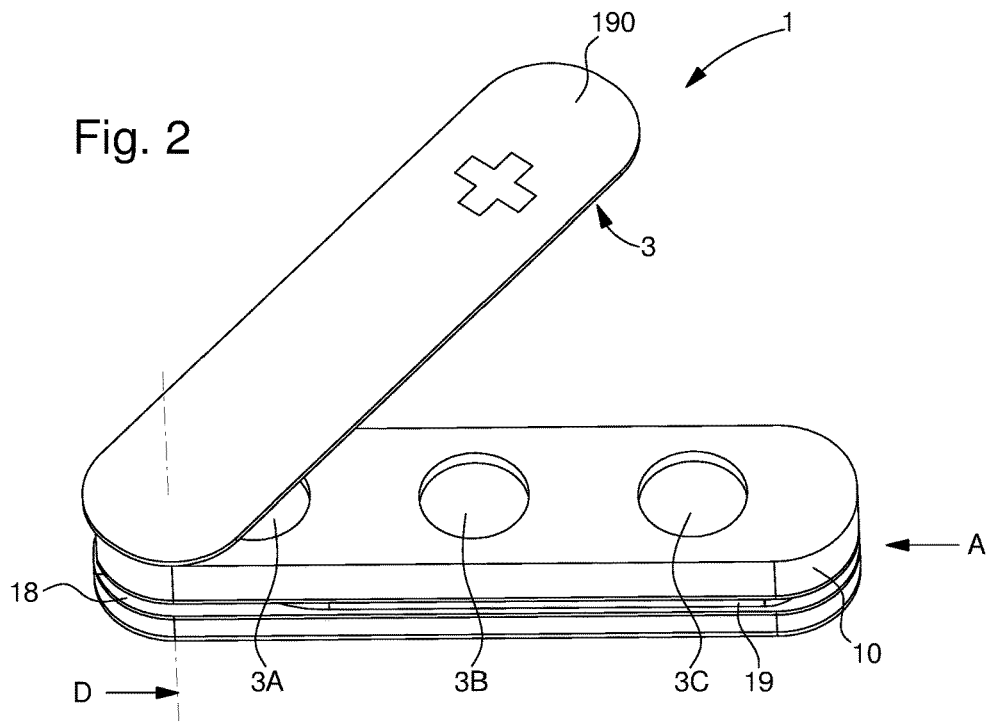
FIG. 2 shows a schematic and perspective view of a similar embodiment wherein the lids are maintained in the closed position by a lateral external part of the tool, which comprises a visual and/or tactile marker for identifying the upper face of the tool.

FIGS. 1 and 2 illustrate a flat structure 10, shown in a longitudinal cross-sectional view in FIG. 13, which forms a reservoir 2 with three distinct chambers: 20A, 20B, 20C, each closed by a snap-fit lid, respectively 3A, 3B, 3C, maintained by a pivoting blade 5 in FIGS. 1 and 13, or by an external part 190 in FIG. 2.

FIG. 2A shows three reservoirs 2A, 2B, 2C, each with the profile of a dovetail tenon, fitted side-by-side into a dovetail mortise comprised in a flat structure 10 similar to the preceding one. Each reservoir comprises a gripping means 21 to facilitate the removal thereof from the guiding member.

FIG. 6 shows a cross-section of a tool comprising a structure 10 comprising a dovetail mortise receiving a dovetail tenon of a reservoir 2. This reservoir 2 is closed by a lid 3, which is held by a sliding element 50 whose travel is limited by frame 18.

Figure 7:
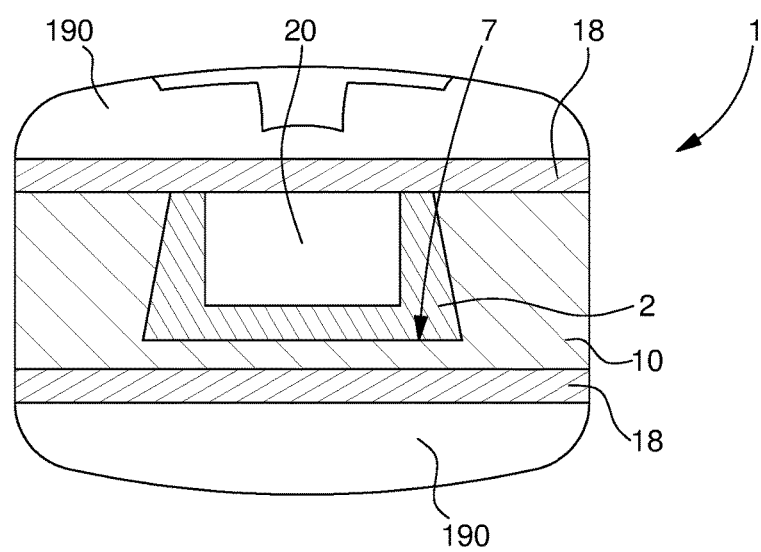

FIG. 7 illustrates the case where such a reservoir 2 is closed not by a small independent lid, as in the preceding variants, but by a component of larger size, here a blade 9, which can close several reservoirs 2 at once.

FIG. 8 illustrates a reservoir with a profile 22 sliding into a complementary profile 102 of a structure 10. A lid 3 is snap-fitted into reservoir 2 and bears both on reservoir 2 and on the structure 10 that carries said reservoir 2. This lid 3 bears on a fixed structure 18.

FIG. 9 illustrates a structure 10 forming a reservoir 2, which is closed by a snap-fit lid 3 and which bears on a fixed structure 18.

FIG. 10 illustrates an even simpler version wherein the structure 10 that forms reservoir 2 bears on a fixed structure 18. Preferably, at least structure 10 or fixed structure 18 is made of elastic material; advantageously structure 10 is made of elastomer or suchlike and ensures the sealing of housing 20 on frame 18.

FIG. 11 illustrates a structure 10 with a lid 3 held in a recessed portion and retained in abutment by a pivoting blade 5, as seen in FIG. 1.

FIG. 12 illustrates, in the lower portion, a reservoir 2 snap-fitted into a structure 10, closed by a lid 3 held by a blade 9; and in the upper portion, another structure 10 forming reservoir 2 and comprising a dovetail mortise 21 receiving a lid 3 with a dovetail tenon 31, which bears on a blade 19.

In yet another variant, not illustrated in the Figures, tool 1 comprises a removable tray, mounted to pivot or slide and retained in a closed position in the body of tool 1 by a resilient lug or suchlike. This tray comprises one or more reservoirs 2 and a lid, which is automatically pressed onto the tray body when closed, guaranteeing sealing and preventing the lubricant(s) from spilling or drying out. In a particular variant, this lid is captively hinged to the body of the tray.

For operations on clocks and building clocks, tool 1 further advantageously includes a light in the form of a torch with a narrow beam, housed in a housing 7 of tool 1. In an advantageous variant, this torch comprises a housing for reception of an oil-pike 9, oriented such that the distal end of the oil-pike 9 used to deposit lubricant is in the axis of the torch light beam. This light is advantageously provided in addition to a magnifying glass, to improve the visibility and precision of the lubricating operation, or of any difficult operation performed with tool 1: screwing, setting or suchlike.

The invention claimed is:

1. A watchmaker's portable lubrication tool, wherein said tool comprises a plurality of chambers comprised in at least one horological lubricant reservoir, each only accessible to a user in a first open position of said tool, each said reservoir being closable by at least one sealed lid which, in a second closed position, is kept sealingly pressed on said reservoir, wherein said tool comprises a carrier structure for at least one said reservoir and for a said lid associated with said reservoir, and wherein said structure is a component of a multi-function pocket knife of the "Swiss army knife" type, which comprises a frame on which pivots a plurality of blades, wherein said tool comprises at least one elastic return means arranged to exert, while in the second closed position, a force on said at least one lid to press said lid sealingly on said at least one reservoir.

2. The tool according to claim 1, wherein at least one said lid is made of elastic or elastomeric material or of rubber or of cork.

3. The tool according to claim 1, wherein the tool comprises at least one pivoting element or one sliding element which is arranged, in said second closed position, to form a stop surface for said at least one lid to limit the travel thereof or to compress said lid onto said at least one reservoir.

4. The tool according to claim 3, wherein at least one said pivoting element is formed by a said blade.

5. The tool according to claim 1, wherein at least one said lid is formed by a said blade.

6. The tool according to claim 1, wherein at least one said lid cooperates with a said reservoir via translation guiding means or via a dovetail guiding arrangement.

7. The tool according to claim 1, wherein the tool comprises a separate first housing for each said reservoir.

8. The tool according to claim 1, wherein at least one said reservoir is removable to be cleaned or filled.

9. The tool according to claim 8, wherein the tool comprises first snap-fit means for said at least one reservoir which are provided in said at least one reservoir and/or in said structure that carries said at least one said first housing, to hold said reservoir in said first housing thereof.

10. The tool according to claim 7, wherein said structure carries at least one said first housing, and wherein at least one said reservoir cooperates with said structure via translational guiding means or via a dovetail guiding arrangement.

11. The tool according to claim 10, wherein at least one said blade comprises part of said translational guiding means or of said dovetail guiding arrangement of said at least one reservoir.

12. The tool according to claim 1, wherein the tool comprises at least a second housing for at least one said lid.

13. The tool according to claim 12, wherein the tool comprises second snap-fit means for said at least one lid which are provided in said at least one lid and/or in said structure that carries said at least one said second housing, to keep said lid sealingly in position in said second housing thereof, in a closed position of said lid.

14. The tool according to claim 12, wherein the tool comprises screw means for said at least one lid which are provided in said at least one lid and in said structure comprised in said tool and that carries said at least one said second housing, to hold said lid in said second housing thereof, in a closed position of said lid.

15. The tool according to claim 1, wherein each said reservoir comprises a colour or an optical code relating to a lubricant that said reservoir is arranged to contain, and wherein each said lid arranged to cooperate with a said specific reservoir comprises the same colour or the same optical code as said specific reservoir.

16. The tool according to claim 15, wherein each said reservoir comprises a colour or an optical code relating to a lubricant that said reservoir is arranged to contain, and wherein said tool comprises at least one oil-pike for each category of lubricant, each said oil-pike comprising the same colour or the same optical code as said specific reservoir associated with the same lubricant.

17. The tool according to claim 16, wherein each said oil-pike has a specific form and surface for each said category of lubricant.

18. The tool according to claim 1, wherein the tool comprises at least one oil-pike in one-piece with at least one said lid.

19. The tool according to claim 1, wherein the tool comprises at least one oil-pike arranged to be snap-fitted, via an end opposite to that intended for the transfer of lubricant, into a housing comprised in a frame of said tool.

20. The tool according to claim 1, wherein the tool comprises at least one folding magnifying glass comprising two lenses able to be extended or folded away by translation and/or rotation of a body comprised in said magnifying glass that carries said lenses.

21. The tool according to claim 20, wherein the tool comprises at least one said blade whose extended end serves as a magnifying glass according to claim 20.

* * * * *